United States Patent
Pazhayannur et al.

(10) Patent No.: US 6,561,516 B2
(45) Date of Patent: May 13, 2003

(54) LOW POWER HIGH SPEED DISC DRIVE SPINDLE SEAL

(75) Inventors: Ram V. Pazhayannur, Crystal, MN (US); David D. Koester, Chanhassen, MN (US); John W. Elsing, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/895,052

(22) Filed: Jun. 29, 2001

(65) Prior Publication Data

US 2003/0001340 A1 Jan. 2, 2003

(51) Int. Cl.$^7$ ................................................ F16J 15/43
(52) U.S. Cl. .................... 277/410; 277/409; 277/411
(58) Field of Search ............................ 277/410, 409, 277/411

(56) References Cited

U.S. PATENT DOCUMENTS

| | | | | |
|---|---|---|---|---|
| 4,200,296 A | * | 4/1980 | Stahl et al. | 277/302 |
| 4,304,411 A | * | 12/1981 | Wilcock et al. | 277/410 |
| 4,335,885 A | * | 6/1982 | Heshmat | 277/347 |
| 4,444,398 A | * | 4/1984 | Black et al. | 277/302 |
| 4,527,802 A | * | 7/1985 | Wilcock et al. | 277/302 |
| 5,267,737 A | * | 12/1993 | Cossette et al. | 277/410 |
| 5,271,631 A | * | 12/1993 | Yokouchi et al. | 277/410 |
| 6,290,233 B1 | * | 9/2001 | Yamamura et al. | 277/410 |

* cited by examiner

Primary Examiner—Anthony Knight
Assistant Examiner—E Peavey
(74) Attorney, Agent, or Firm—Moser, Patterson & Sheridan, LLP.

(57) ABSTRACT

A stationary ferrofluidic seal for sealing a stationary shaft to a rotating hub. A formed magnetic is attached to the rotating hub, bounded by upper and lower members to form a shaped cavity. A stationary ring is attached to the shaft and extends into the cavity, which is filled with a conductive ferrofluid. The cavity has a uniform, concave cross section over at least part of its surface. The end of the stationary ring distal from the shaft is shaped so that in the region containing the fluid, the ring and cavity surface are equidistant from a set of points defining the seals "characteristic contour". The seal's Power Index is defined as $(A \times R^2)/(\Delta \times V)$, where:

A=surface area of the characteristic contour
R=maximum radius of the contour about the axis of rotation
$\Delta$=average gap between the inner and outer member
V=total volume of the fluid Power loss is minimized by constructing the seal so that the Power Index is less than 700 (more preferably in the range of about 200 to 500).

19 Claims, 5 Drawing Sheets

| Example | L (mm) | A (sq mm) | R (mm) | Δ (mm) | V (cubic mm) | Power Index |
|---|---|---|---|---|---|---|
| A | 1.3 | 8.2 | 1.00 | 0.145 | 1.2 | 47 |
| B | 1.4 | 40 | 4.50 | 0.500 | 20 | 81 |
| C | 0.7 | 5.5 | 1.25 | 0.126 | 0.70 | 97 |
| D | 0.7 | 4.4 | 1.00 | 0.100 | 0.44 | 100 |
| E | 1.3 | 12 | 1.50 | 0.145 | 1.8 | 105 |
| F | 0.7 | 6.6 | 1.50 | 0.126 | 0.83 | 142 |
| G | 1.3 | 16 | 2.00 | 0.145 | 2.4 | 187 |
| H | 0.4 | 4.7 | 1.88 | 0.125 | 0.60 | 221 |
| I | 0.7 | 7.0 | 1.50 | 0.100 | 0.70 | 225 |
| J | 1.4 | 35 | 4.00 | 0.250 | 8.8 | 255 |
| K | 1.4 | 75 | 8.50 | 0.500 | 37 | 293 |
| L | 1.4 | 33 | 3.75 | 0.200 | 6.6 | 352 |
| M | 1.9 | 57 | 4.75 | 0.254 | 14 | 362 |
| N | 0.7 | 11 | 2.50 | 0.126 | 1.4 | 390 |
| O | 0.7 | 8.8 | 2.00 | 0.100 | 0.90 | 391 |
| P | 1.6 | 45 | 4.50 | 0.214 | 9.5 | 448 |
| Q | 2.1 | 82 | 6.25 | 0.275 | 23 | 506 |
| R | 1.6 | 50 | 5.00 | 0.211 | 11 | 539 |
| S | 1.5 | 40 | 4.25 | 0.175 | 7.0 | 590 |
| T | 3.0 | 170 | 9.00 | 0.350 | 60 | 656 |
| U | 2.3 | 87 | 6.00 | 0.230 | 20 | 681 |

Figure 4

LOW POWER HIGH SPEED DISC DRIVE SPINDLE SEAL

FIELD OF THE INVENTION

The present invention generally relates generally to the field of disc drives, and more particularly to an apparatus and method for providing a reliable, ferrofluidic seal between a hub and a shaft of a spindle motor in a disc drive.

BACKGROUND OF THE INVENTION

Disc drives, including magnetic disc drives, optical disc drives and magneto-optical disc drives, are widely used for storing information. A typical disc drive has one or more discs for storing information in a plurality of concentric circular tracks. This information is written to and read from the discs using read/write heads mounted on actuator arms which are moved from track to track across surfaces of the discs by an actuator mechanism. The discs are mounted on a spindle which is turned by a spindle motor to pass the surfaces of the discs under the read/write heads. The spindle motor generally includes a shaft fixed to a baseplate and a hub, to which the spindle is attached, having a sleeve into which the shaft is inserted. Permanent magnets attached to the hub interact with a stator winding on the baseplate to rotate the hub relative to the shaft. Bearings between the hub and the shaft facilitate rotation of the hub.

The spindle motor also typically includes an exclusion seal to seal interfacial spaces between the hub and shaft. This is necessary, because lubricating fluids or greases used in the bearings tend to give off aerosols or vaporous components that migrate or diffuse out of the spindle motor and into a disc chamber in which the discs are maintained. This vapor often transports other particles, such as material abraded from the bearings or other components of the spindle motor, into the disc chamber. These vapors and particles deposit on the read/write heads and the surfaces of the discs, causing damage to the discs and the read/write heads as they pass over the discs. Thus, the migration of these contaminants into the disc chamber must be prevented.

To prevent the migration of these contaminants into the disc chamber, the latest generation of spindle motors utilize a ferrofluidic seal between the shaft and the hub. Ferrofluidic seals are described in, for example, U.S. Pat. No. 5,473,484, which is incorporated herein by reference. A typical ferrofluidic seal consists of ferrofluid, an axially polarized annular magnet and two magnetically permeable annular pole pieces attached to opposing faces of the magnet. The ferrofluid is conventionally composed of a suspension of magnetically permeable particles suspended in a fluid carrier. Generally, the magnet and the pole pieces are fixed to the hub and extend close to but do not touch the shaft. Magnetic flux generated by the magnet passes through the pole pieces and the shaft, which is also magnetically permeable, to magnetically hold the ferrofluid in gaps between the pole pieces and the shaft, thereby forming a seal.

As noted above, current ferrofluidic seals use a rotating design in which the magnet and pole pieces are affixed to the hub, and a ferrofluid seal is found between the rotating pole pieces and the fixed shaft. Although this design has worked well for conventional spindle motors, the latest generation of motors rotate at high speeds, often exceeding 10,000 revolutions per minute (rpm). The centrifugal forces developed at such high speeds often exceed the ability of the ferrofluidic seal's magnetic flux to hold the ferrofluid against the shaft due to the velocity gradient across the ferrofluid, resulting in the failure of the ferrofluidic seal.

Accordingly, there is a need for a ferrofluidic seal that is reliable at high rotational speeds.

SUMMARY OF THE INVENTION

The present invention provides a solution to these and other problems, and offers other advantages over the prior art.

The present invention relates to an apparatus for sealing the outer surface of a shaft to a face of a hub disposed about the shaft that solves the above problems.

In yet another aspect, the present invention is directed to a ferrofluidic seal for sealing a stationary shaft to a rotating hub. A formed magnet is attached to the rotating hub, bounded by upper and lower members to form a shaped cavity. A stationary ring is attached to the shaft and extends into the cavity, which is filled with a conductive ferrofluid. The cavity has a uniform, concave cross section over at least part of its surface. The end of the stationary ring distal from the shaft is shaped so that in the region containing the fluid, the ring and cavity surface are equidistant from a set of points defining the seals "characteristic contour". The seal's Power Index is defined as $(A \times R^2)/(\Delta \times V)$, where:

A=surface area of the characteristic contour

R=maximum radius of the contour about the axis of rotation $\Delta$=average gap between the inner and outer member V=total volume of the fluid Power loss is minimized by constructing the seal so that the Power Index is less than 700 (more preferably in the range of about 200 to 500). This differs from prior systems by allowing very high rotation rates with acceptable power consumption.

The current invention enables seals to be operated at high rotational velocities at acceptable power levels.

The present invention is particularly useful in a spindle motor such as used in a disc drive. A spindle motor generally has a base supporting a shaft, and a hub having an inner surface disposed about an outer surface of the shaft. An embodiment of a seal according to the present invention is positioned between the shaft and the hub to seal the outer surface of the shaft to the inner surface of the hub and to electrically couple the shaft to the hub.

These and various other features as well as advantages which characterize the present invention will be apparent upon reading of the following detailed description and review of the associate drawings.

DETAILED DESCRIPTION OF THE PREFERRED EMBODIMENT

Figure 1:
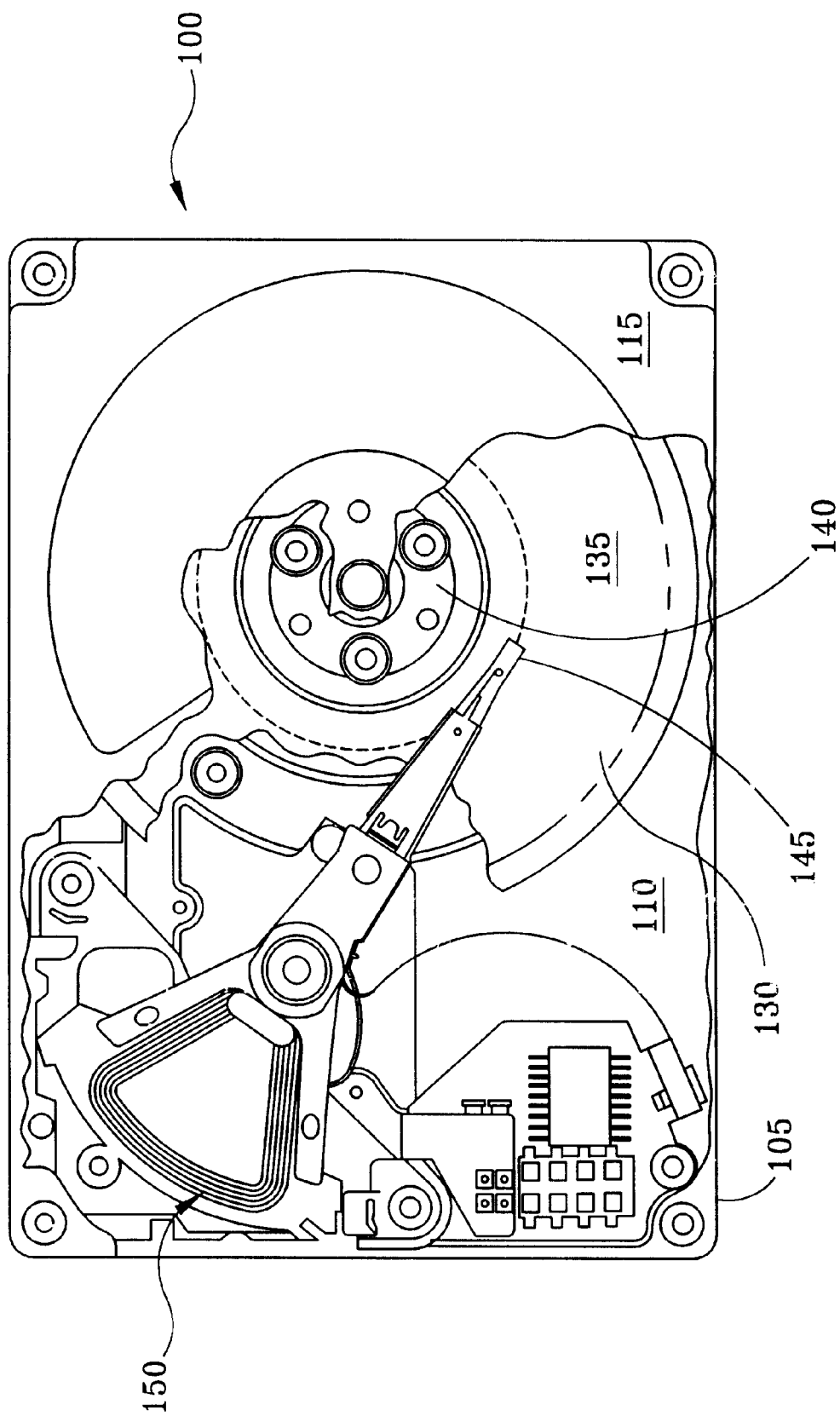
FIG. 1 (prior art) is a plan view of a disc drive in which a spindle motor incorporating a ferrofluidic seal according to the embodiment of the present invention is useful.

FIG. 1 is a plan view of a magnetic disc drive for which a spindle motor having a ferrofluidic seal according to the present invention is particularly useful. Referring to FIG. 1, a disc drive 100 typically includes a housing 105 having a base 110 joined to a cover 115. One or more of discs 130 having surfaces 135 covered with a magnetic media (not shown) for magnetically storing information are attached to a spindle 140. A spindle motor (not shown in this figure) turns the spindle 140 to rotate the discs 130 past read/write heads 145 which are suspended above surfaces 135 of the discs by a suspension arm assembly 150. In operation, the discs 130 are rotated at high speed past the read/write 145 while the suspension arm assembly 150 moves the read/write heads in an arc over a number of radially spaced tracks (not shown) on the surfaces 135 of the disc 130. This enables the read/write heads 145 to read and write magnetically encoded information to the magnetic media on the surfaces 135 of the discs 130 at selected locations.

Figure 2A:
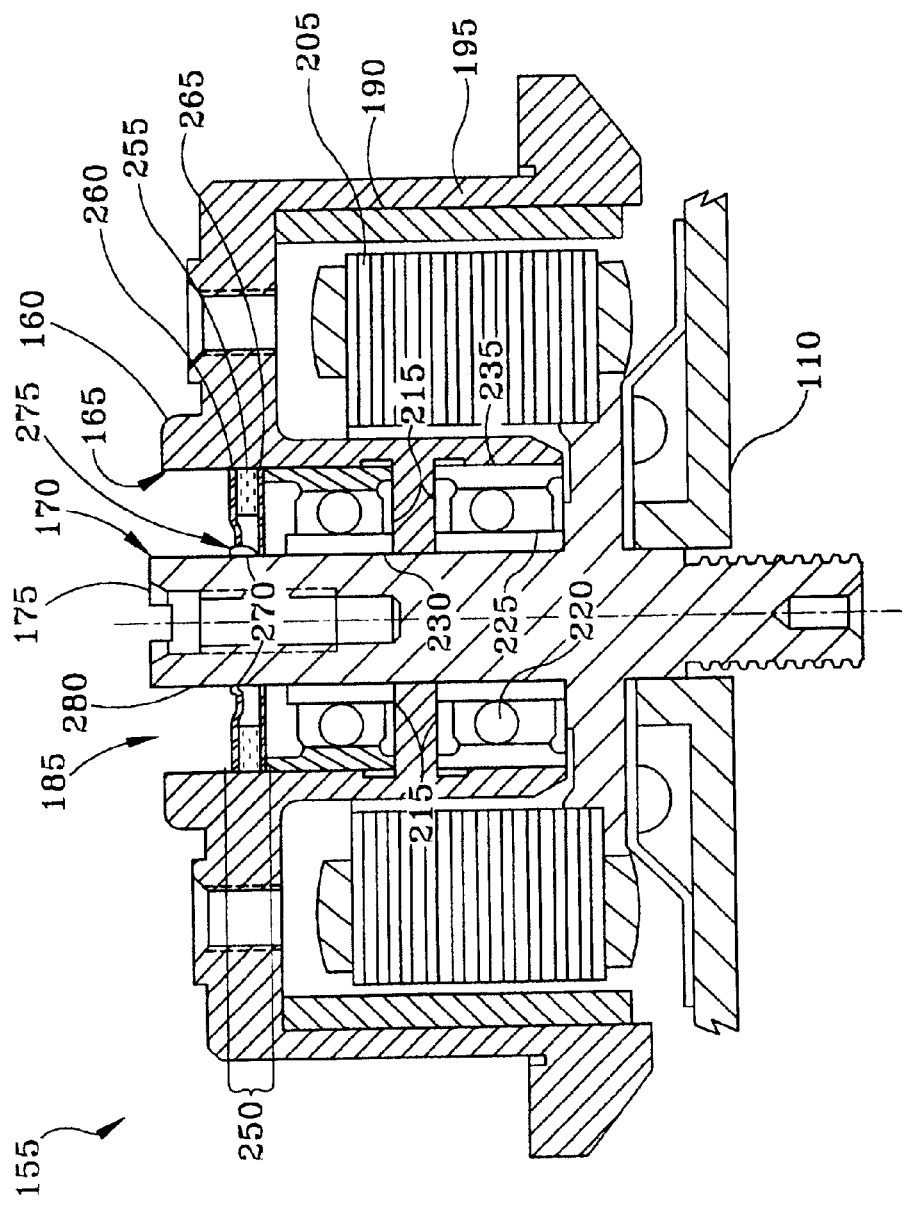
FIG. 2A (prior art) is a sectional side view of an embodiment of a spindle motor in which the present invention is useful, illustrating a ferrofluidic seal according to the prior art.

FIG. 2A is a sectional side view of a spindle motor 155 of a type which is especially useful in disc drives 100. Typically the spindle motor 155 includes a rotatable hub 160 having an inner surface 165 disposed about an outer surface 170 of a shaft 175. A ferrofluidic seal 185 seals the outer surface 170 of the shaft 175 to the inner surface 165 of the hub 160. One or more magnets 190 attached to a periphery 195 of the hub 160 interact with a stator winding 205 attached to the base 110 to cause the hub 160 to rotate. The hub 160 is supported on the shaft 175 by one or more bearings 215, such as fluid dynamic bearings (not shown) or ball bearings 215 as shown in FIG. 2. A ball-bearing generally balls 220 loosely held by a retainer 225 between an inner race 230 and an outer race 235. Interfacial spaces (not shown) between the balls 220, the retainer 225 and the inner and outer races 230, 235, can be filled with a lubricating fluid or grease to facilitate movement of the balls 220. The structure of the bearing 215 is not material to the invention. What is significant is that the ferrofluidic seal 185 must maintain a seal between the outer surface 170 of the shaft 175 and the inner surface 165 of the hub 160 so that the fluid, grease and other loose particles associated with the bearing 215 cannot reach the discs 130.

A typical ferrofluidic seal 185, such as shown in FIG. 2A, includes a laminate 250 consisting of an annular magnet 255, with top and bottom pole pieces 260, 265, coupled to opposite poles thereof. The magnet 255 and pole pieces 260, 265, are attached and sealed, using an epoxy or solder, to the inner surface 165 of the hub 160 or the outer surface 170 of the shaft 175. A ferrofluidic fluid (ferrofluid 270) is magnetically held in a gap 275 between the pole pieces 260, 265, and the outer surface 170 of the shaft 175 or the inner surface 165 of the hub 160 to seal the shaft to the inner surface of the hub. The ferrofluid 270 typically includes ferromagnetic particles, such as $Fe_3O$ or magnetite, colloidally suspended in a carrier fluid, such as a hydrocarbon or synthetic ester based fluid. In a conventional ferrofluidic seal 185, the ferrofluid 270 forms a top meniscus 280, as shown in FIG. 2A, that during dynamic operations, especially operation at the high speeds which are becoming increasingly common, can cause splashing and migration of the ferrofluid due centrifugal force exerted on the ferrofluid of the rapidly rotating ferrofluidic seal. This splashing and migration can cause contamination of the discs 130 and loss of the hermetic seal.

Turning next to the details of the seal of the present invention, the invention herein identifies two critical components for a spindle seal used in applications such as disc drives, and especially those where the spindle motor shaft or hub is rotating faster than 10,000 RPM. The first of these is to maintain the seal integrity at these and higher rotational velocities. The second of these is to consume very low power while satisfying the first requirement. In the field of spindle seals, such as are required to prevent particles, gasses and other undesirable elements from moving from the ball bearing or shaft region out into the region of the rotating discs, some prior systems operated successfully at low rotational velocities. However, these were typically unsuccessful in maintaining seal integrity at high RPMs. Other designs, overcame the speed limitations, but consumed excessive power. Therefore, the designs of the present invention were developed.

Figure 2B:
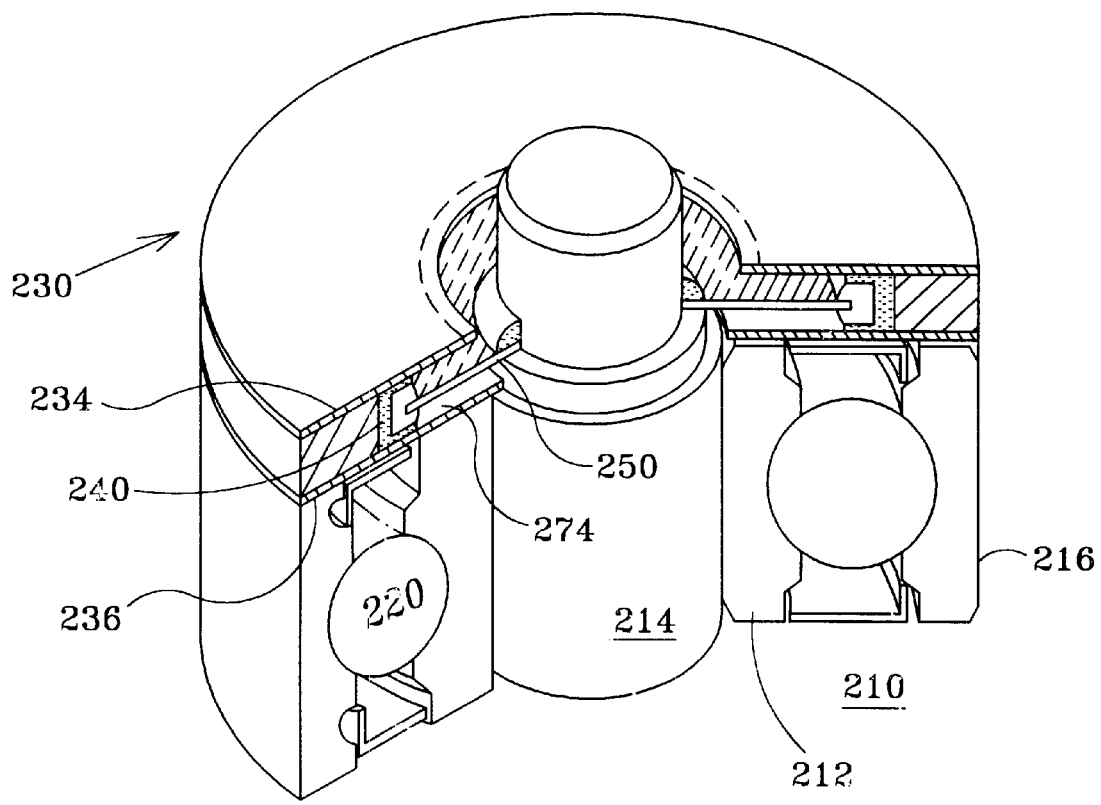
FIG. 2B is a sectional view of one exemplary embodiment of the present invention.
Figure 2C:
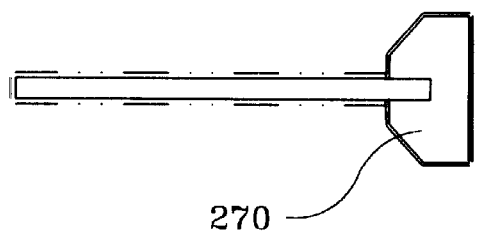
FIG. 2C is a vertical section of one element of the embodiment of FIG. 2B.

The basic elements of the present invention can be seen in the detailed cutaway view of FIG. 2B showing a disc drive stator and rotor and one embodiment is the seal of the present invention. In this example, the seal is shown adjacent a ball bearing 210 comprising an inner race 212 which is supported from or attached to a shaft 214 and an outer race 216 which will support a hub when the motor is used in a disc drive or similar mechanical supported element for rotation relative to the shaft 214. In order to prevent any lubricants, gasses, particles, or the like which are generated by the balls 220 of the ball bearing rolling in the races 212, 216, from reaching the interior of the HDD, it is already well-known to provide a magnetic seal generally indicated at 230 immediately adjacent the ball bearing and intervening between the ball bearing and the air space surrounding the discs of the disc drive. In this embodiment, where the shaft 214 is fixed to the inner race 212, and the outer race 216 rotates, a magnet is provided supported atop the outer race 216 and rotating with that race in this particular fixed shaft embodiment, and axially spaced from the ball bearing along the shaft. In this way, the magnet forms a basic element of the structure of the magnetic seal, and one of these is provided at either end of the system supported about the shaft.

Adjacent the magnet 232 are two plates 234, 236 formed of a magnetic material. These cooperate with the magnet 232 to define a recess 240 in which the magnetic fluid is placed. The seal is completed by providing a stationary ring 250 typically in the form of a plate with a shaped pole piece on the distal end thereof supported from the shaft 214 and extending radially out from the shaft to the recess defined between the upper and lower plates 234, 236 and the magnet 232. This ring 250 extends close to the interior of the recess where the conductive ferrofluid 260 is retained and includes on an end thereof as shown most clearly in FIG. 2C a shaped pole piece 270. The pole piece 270 is shaped in this instance and the other embodiments to be described below to have a substantially uniform spacing between at least a part of the outer surface 272 of the pole piece and a portion of the inner surface 274 of the recess 240.

The pole piece may be formed, for example, of plastic or nylon with a magnetic material covering such as Ni plating; this may also be used to form ring 250. The recess 240 has at least in a part of its interior a substantially uniform concave cross-section (herein also called pocket) that contains the conductive ferrofluid 260. In order to optimize the sealing ability of the seal, it has a characteristic contour which is defined as the center points within the sealed fluid that are equidistant between the inner member, i.e., the surface 272 of the pole piece, and the outer member, i.e., the surface of the concave cross-sectional recess defined by the upper and lower plates 234 and 236 and the inner surface of the magnet 232.

Given this characteristic contour, the seal's Power Index is defined as $(A \times R^2)/(\Delta \times V)$, where:

A=surface area of the characteristic contour

R=maximum radius of the contour about the axis of rotation $\Delta$=average gap between the inner and outer member V=total volume of the fluid Power loss is minimized by constructing the seal so that the Power Index is less than 700 (more preferably in the range of about 200 to 500). This differs from prior systems by allowing very high rotation rates with acceptable power consumption.

The current invention enables seals to be operated at high rotational velocities at acceptable power of levels.

Considering in further detail the example of FIG. 2B, it shows that the stationary ring which is supported from the shaft is, in this example, held in place by a conductive adhesive 290. Obviously, other means of supporting the stationary ring may be provided so that the ring is held stable relative to the recess which is rotating around the end of the ring and the pole piece 270 that it supports. The fluid 260 is held in place by the rotating outer members centrifugal force, by the rotating member being comprised of the upper and lower plates 234, 236 and the magnet 240, as well as by surface tension, wetting, and by the magnets attractive for the magnetic fluid 260. Providing the shaped surface which is defined herein for both the outer surface of the recess and the outer surface of the pole piece provides a larger wetted surface. Further, the pole piece occupies the substantial portion of the recess, which means that the centrifugal force is more effective in holding the fluid in place within the recess since the space between the inner surface of the rotating member and the outer surface of the pole piece can be defined to be relatively narrow.

Figure 3A:
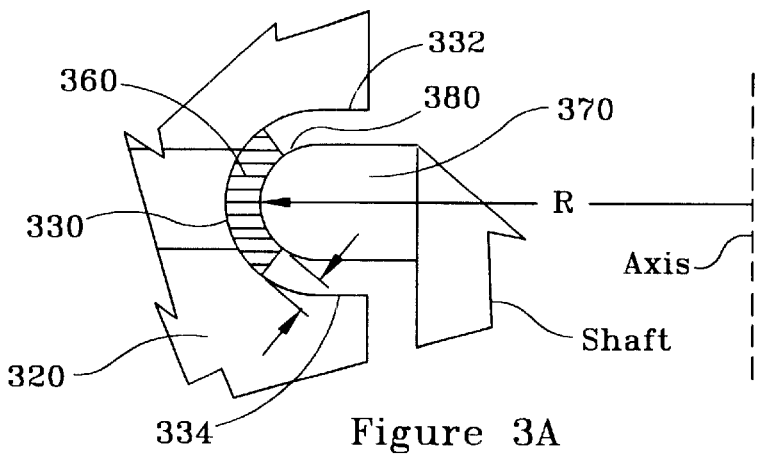
FIGS. 3A–3D are partial sectional views illustrating alternative embodiments of this invention.

The first preferred configuration of the present invention is shown in FIG. 3A. In this figure, the pole piece 370, which forms the inner member, has a flat upper and lower surfaces and a smoothly curved end surface 380. The inner surface of the rotating outer member 320 also has a smoothly rounded curvature curved inner surface 330 ending in flat axially radially extending upper and lower surfaces 332, 334. In this configuration, any current losses and edge effects, which would be created with the sharp corners and edges of the embodiment of FIG. 2A, are prevented or minimized by providing the smoothly curved surface which is shown. Preferably, the radii of curvature are below 0.01R everywhere that the fluid 360 touches. Therefore, the seals Power Index and its effectiveness can be measured by applying example K from Table 4.

L is the length of the characteristic contour, and A is generally approximated by 2*pi*R*L. Example "I" is modeled with a textured surface, however, so that A is slightly larger than this approximation, increasing the Power Index from 212 to 225. It is also apparent that the magnet 232 has a greater axial dimension than the pole piece, and that has a curved cross-section at the end facing the pole piece.

Figure 3B:
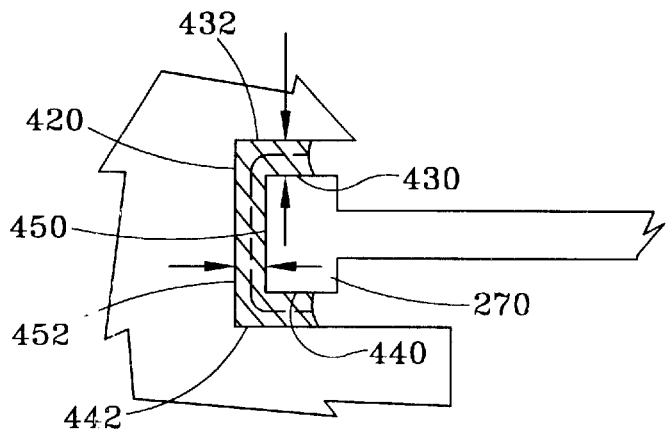

A more easily manufactured seal configuration is shown in FIG. 3B. In this figure, the recess is generally rectangular, as also shown in the embodiment of FIG. 2B, and the pole piece 270 has a generally flat outer surface and a generally rectangular cross-section looked at in a side view. In this case, the characteristic contour is represented by the line 420; and it can be seen that the spacing between the outer surface of the pole piece and the inner surface of the recess may be somewhat greater between the axially upper and lower surfaces 430, 440 of the pole piece and the inner axial surfaces 432, 442, than it is between the outer surface of the pole piece facing in the axially direction 450 and the corresponding surface of the recess 452. Also, in this case, the lower pole plate is somewhat extended in the radial direction to prevent loss of fluid due to splashing. This is because gravitational effects will draw somewhat more of the fluid down toward this lower ledge surface. According to the preferred embodiment which has dimensions consistent with examples A, E, S, or T of Table 4, the ledge 442 which desirably exceeds 0.1R to 0.2R to reduce loss of fluid due to the splashing.

Figure 3C:
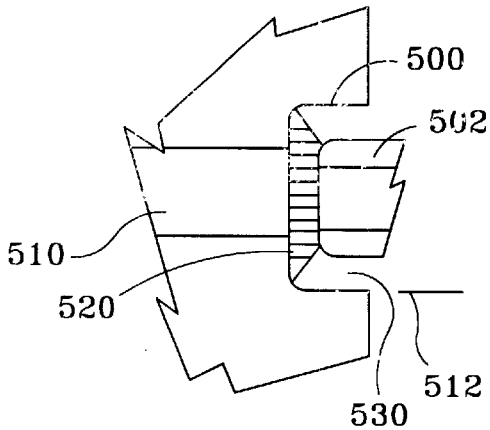

A variation of the embodiment of FIG. 3B is shown in FIG. 3C where both the recess 500 and the pole piece 502 are similar in configuration to what appears in FIG. 3B, but with some variation especially in that the interior corners of the pocket or recess 500 are rounded as are the exterior corners of the pole piece 502. Further, in addition to the magnet 510, which is incorporated in the recess 500, in a preferred embodiment, a further magnet 512 is incorporated in the pole piece having preferably an axial length which is the same as or less than magnet 510. This additional magnet 512 carried in the pole piece which is of less radial extent preferably than the magnet 510 which is incorporated in the outer member, or hub, or spindle, serves to concentrate the fluid 520 in the desired region of the gap, diminishing the need for an extended ledge as appears in FIG. 3B. It can be seen that the gap 530 between the outer member and the pole piece is substantially the same over the entire region of interest, although it may widen some in the gap in the axial direction gaps.

Figure 3D:
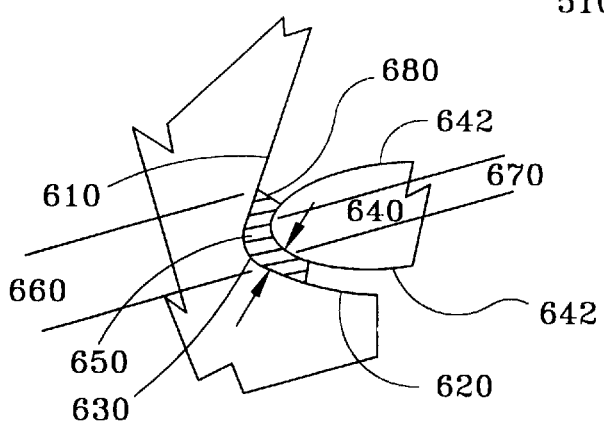

A further preferred embodiment of the present invention is shown in FIG. 3D. In this embodiment, again shown in vertical cross-section so that it can be easily visualized as incorporated into the overall embodiment of FIG. 2A, yet a further embodiment is shown in FIG. 3D which has the benefit, at least in certain embodiments, with certain measurements, of achieving operation in the desired range of the power index. In this embodiment, the recess has a dramatically modified shape from the other embodiments, comprising a tapered wall 610 extending generally in the axial direction, but being inclined from its point of maximum distance from the shaft which is adjacent the pole piece to a point which is less distant from the shaft as the wall moves away from the pole piece.

The design further comprises a ledge 620 which is somewhat inclined toward the center of the shaft and away from the end of the shaft as the wall extends toward the shaft. In the region 630 where the walls meet, they meet in a curved region. The pole piece itself is tapered so that its walls 642, 644 as viewed in vertical or axial cross-section gradually extend toward each other, meeting at or near a point 650, which does form a somewhat curved nose. The gap, which must be measured to define the characteristic $\Delta$ should be measured in the region where the tapered walls of the pole piece are near to the tapered walls 610, 620 of the outer member. The magnet 660 must be of reasonable strength in order to maintain the fluid at or near this defined gap region, and a further magnet 670 may be incorporated in the pole piece to aid in maintaining the fluid in the gap region even when there is no relative rotation.

At rest, the seal fluid 680 flows to a lower position in which L is the length of the characteristic contour is about five times $\Delta$ which is the average gap. As the seal begins to rotate, that is, as the pole piece and outer member achieve relative rotation, the fluid flows quickly to a dynamic position in which the ratio of L/$\Delta$ decreases by at least 5–10%. At speed, this embodiment has dimensions, such as examples B, H or K or Table 4. Therefore, at least with examples H or K, the desired power index can be achieved with this embodiment.

Other features and advantages of this invention will become apparent to a person of skill in the art who studies this invention disclosure. Therefore, the scope of the present invention is to be limited only by the following claims.

What is claimed is:

1. A seal for sealing an outer surface of a magnetically permeable shaft to an inner surface of a hub disposed about the shaft, the seal comprising and outer member including:
    an annular magnet positioned between the shaft and the hub;
    a top pole piece and a bottom pole piece coupled to opposite poles of the magnet, the top and bottom pole pieces comprising a material which is magnetically permeable, and having annular shapes with interior radii that are larger than the radius of the outer surface of the shaft to define a concave region in which a ferrofluid is held, an inner member including an annular ring supported from the shaft and extending into the concave region and supporting a short, axially extended pole piece at an end thereof to define a contoured gap in the concave region where the ferrofluid is held, the surface of the pole piece having a relatively uniform spacing from an inner surface of the recess, wherein the contoured gap includes a characteristic contour defined as a set of points within the concave region of the ferrofluid that are equidistant between a surface of the concave region and an outer surface of the pole piece, and usable to define a Power Index (PI)=(A×R^2)/Δ×V) wherein
    A=surface area of the characteristic contour
    R=maximum radius of the contour about the axis of rotation
    Δ=average gap between the inner and outer member
    V=total volume of the fluid
    and wherein the seal is optimized for PI<700.

2. A seal as claimed in claim 1 wherein the concave region interior surface of the outer member is smooth, having radii of curvature below 0.01 R everywhere the ferrofluid touches.

3. A seal as claimed in claim 1 wherein the pole piece of the inner member has a substantially constant spacing from the inner, contoured surface of the outer member in the fluid region.

4. A seal as claimed in claim 1 wherein the pole piece comprises nylon coated with a magnetic material.

5. A seal as claimed in claim 1 wherein the pole piece is coated with a nickel plating.

6. A seal as claimed in claim 1 wherein the outer surface of the pole piece and the inner surface of the recess are both substantially rectangular in cross-section.

7. A seal as claimed in claim 6 wherein the gap between the radially outer end of the pole piece and the inner surface of the recess is slightly greater than the axially gap between the pole piece and the recess.

8. A seal as claimed in claim 7 wherein the axially inner surface of the recess is of greater radial extent than the axially outer surface, in order to further diminish fluid loss due to splashing.

9. A seal as claimed in claim 8 wherein the axially inner surface of the recess is of a dimension of about 0.1 R to 0.2 R, where R is the distance from the center line between the pole piece and the recess to the axis of the shaft.

10. A seal as claimed in claim 1 wherein the corners of the recess and of the pole piece are rounded.

11. A seal as claimed in claim 10 wherein the pole piece includes a magnet whose axially radially outer surface faces the inner surface of the recess.

12. A seal as claimed in claim 10 wherein the axial dimension of the pole piece magnet is less than the axial extent of the magnet which defines a part of the recess.

13. A seal as claimed in claim 12 wherein the gap between the outer surface of the pole piece and the inner surface of the recess is substantially uniform over the entire region where the fluid may be found.

14. A seal for sealing an outer surface of a magnetically permeable shaft to an inner surface of a hub disposed about the shaft, the seal comprising and outer member including:
    an annular magnet positioned between the shaft and the hub;
    a top pole piece and a bottom pole piece coupled to opposite poles of the magnet, the top and bottom pole pieces comprising a material which is magnetically permeable, and having annular shapes with interior radii that are larger than the radius of the outer surface of the shaft to define a concave region in which a ferrofluid is held, an inner member including an annular ring supported from the shaft and extending into the concave region and supporting a short, axially extended pole piece at an end thereof to define a contoured gap in the concave region where the ferrofluid is held, the surface of the pole piece having a relatively uniform spacing from an inner surface of the recess wherein the contoured gap includes a characteristic contour defined as a set of points within the concave region of the ferrofluid that are equidistant between a surface of the concave region and an outer surface of the pole piece, and usable to define a Power Index (PI)=(A×R^2)/Δ×V) wherein
    A=surface area of the characteristic contour
    R=maximum radius of the contour about the axis of rotation
    Δ=average gap between the inner and outer member
    V=total volume of the fluid
    and wherein the seal is optimized for PI<700,
wherein the pole piece which comprises an inner member of the seal has flat upper and lower surfaces and a smoothly curved end surface, and the inner surface of the outer member has a smoothly rounded curved inner surface.

15. A seal as claimed in claim 14 wherein at least one of the surfaces is slightly textured.

16. A seal as claimed in claim 14 therein the axially extent of the magnet is at least equal to or greater than the axially extent of the pole piece.

17. A seal for sealing an outer surface of a magnetically permeable shaft to an inner surface of a hub disposed about the shaft, the seal comprising and outer member including:
    an annular magnet positioned between the shaft and the hub;
    a top pole piece and a bottom pole piece coupled to opposite poles of the magnet, the top and bottom pole pieces comprising a material which is magnetically permeable, and having annular shapes with interior radii that are larger than the radius of the outer surface of the shaft to define a concave region in which a ferrofluid is held, an inner member including an annular ring supported from the shaft and extending into the concave region and supporting a short, axially extended pole piece at an end thereof to define a contoured gap in the concave region where the ferrofluid is held, the surface of the pole piece having a relatively uniform spacing from an inner surface of the recess, wherein the pole piece comprises two generally axially services which generally taper each other to meet at the axially distal end of the pole piece from the shaft, and wherein the axially lower surface of the recess maintains a substantially constant spacing from the axially lower surface of the pole piece.

18. A seal as claimed in claim 17 wherein the axially upper surface of the recess inclines gradually away from the upper surface of the pole piece, and wherein the fluid is maintained in the recess primarily in the region from the axially end point of the pole piece and extending radially between the axial lower surface of the pole piece and the axial upper surface of the recess.

19. A seal for sealing an outer surface of a magnetically permeable shaft to an inner surface of a hub disposed about the shaft, the seal comprising and outer member including:

an annular magnet positioned between the shaft and the hub;

a top pole piece and a bottom pole piece coupled to opposite poles of the magnet, the top and bottom pole pieces comprising a material which is magnetically permeable, and having annular shapes with interior radii that are larger than the radius of the outer surface of the shaft to define a concave region in which a ferrofluid is held, an inner member including an annular ring supported from the shaft and extending into the concave region and means for maintaining the fluid in the recess in the seal while minimizing the power required to maintain constant speed rotation of the annular ring and pole piece through the recess of the seal.

* * * * *